REPERTORY DIALERS
Filed Dec. 30, 1964
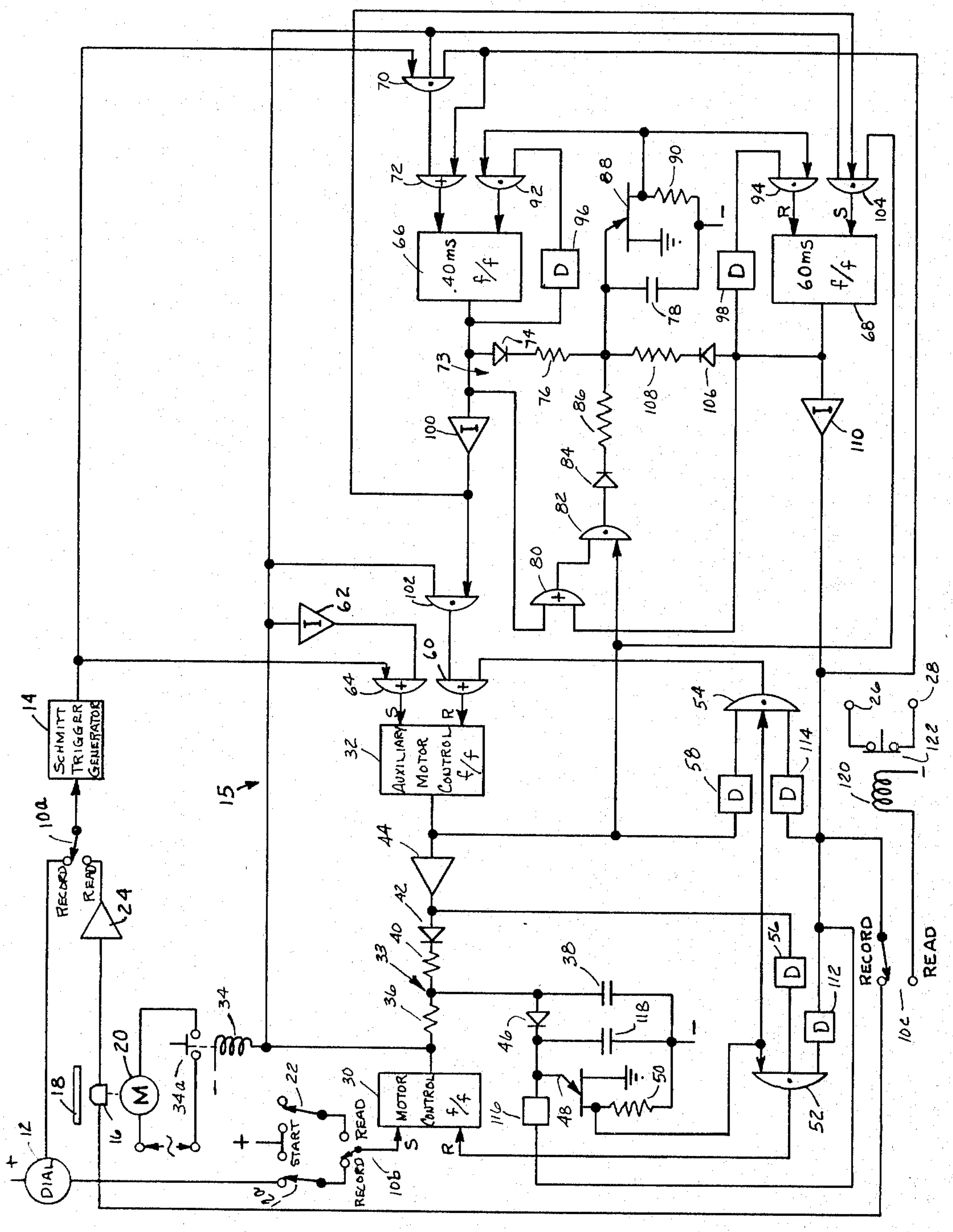
INVENTOR.
ROBIN C. MOSELEY
BY
Philip J. McFarland
ATTORNEY United States Patent Office 3,371,163
Patented Feb. 27, 1968

3,371,163
REPERTORY DIALERS

Robin C. Moseley, San Jose, Calif., assignor to DASA Corporation, a corporation of California
Filed Dec. 30, 1964, Ser. No. 422,344
5 Claims. (Cl. 179—90)

This invention pertains generally to digital data processing apparatus and particularly to apparatus of such type which may be used as an essential part of a repertory dialer.

It is known in the art of repertory dialers that magnetic recording techniques are well adapted to use in processing telephone dial pulses indicating selected telephone numbers. For example, the repertory dialer described in the application for patent of George S. Lockwood et al., Ser. No. 249,223, filed Jan. 3, 1963, now Patent No. 3,321,584 (which is assigned to the same assignee as this application), incorporates an easily replaceable cartridge for a magnetic recording medium, a transducer and means for controlling the relative motion between such medium and transducer either to record signals corresponding to selected groups of telephone dial pulses or to produce appropriately shaped pulse signals corresponding the recorded signals, thereby to replace a conventional dial mechanism.

Although repertory dialers according to the teachings of Lockwood et al. have been accepted (as witness the "Magicall" dialer, model E-1, produced by DASA Corporation, Andover, Massachusetts) experience has proven that randomly occurring variations in operation may sometimes cause incorrect operation. That is, repertory dialers made according to the teachings of Lockwood et al. may, on occasion fail to produce the expected pulse signals, thereby making an incorrect telephone connection.

The tolerances in pulse shape and spacing in telephone systems in the United States determine the accuracy with which any repertory dialer must produce dial pulses. Thus, substantially all the telephone systems require that, as pulse trains are read Out, the pulsing rate in each train be between 9.5 and 10.5 pulses per second, the "make-break" ratio be such that the break be between 58.0 to 64.0 percent of the total pulse and that the time between pulse trains be 600 milliseconds (minimum). With such tolerances, straight-forward magnetic recording techniques as taught by the Lockwood et al. sometimes are not accurate enough for the purpose.

Therefore, it is a primary object of this invention to provide an improved repertory dialer which is so designed that it must, when actuated, produce telephone dial pulses which are so shaped and spaced as to obviate any error due to misoperation of such dialer.

Another object of this invention is to provide an improved repertory dialer which compensates automatically for short term variations in the rate at which individual pulses are read from a magnetic storage medium.

Still another object of this invention is to provide an improved repertory dialer which is adapted to operation according to the preceding objects even though different cartridges are used.

Still another object of this invention is to provide an improved repertory dialer which utilizes conventional components to attain the foregoing objects.

These and other objects of this invention are attained generally by a magnetic memory to store signals representative of selected telephone numbers, a combined transducer drive control and pulse reconstitution circuit which, regardless of wide variations in the rate at which stored signals are read, produces pulses at a predetermined and closely regulated rate. For a more complete understanding of this invention, reference is now made to the accompanying detailed description of a preferred embodiment of this invention as illustrated in the drawing, the single figure of which is a logical diagram showing the details of the contemplated circuit.

Before referring to the drawing, it should be noted that some simplification has been made the better to illustrate the principle of operation of the invention. For example, only a single output line has been shown for each of the flip-flops. This output line indicates a positive signal output when the associated flip-flop is set. The complementary output of each flip-flop is indicated by a branch line containing an inverter. Obviously, in practice appropriate direct connections would be made to the complementary output of each flip-flop in place of the inverters. Further, the various gates (each of which is enabled by a positive waveform) in the illustrated circuit are shown symbolically, it being understood that each gate would, in a practical embodiment, comprise an appropriate diode (or diode matrix), capacitors and resistors. Still further, the delay units (marked "D") may each comprise an appropriate integrating circuit to provide, for reasons to be seen hereinafter, logical delays to various ones of the gates.

Turning now to the figure, it may be seen tha the illustrated circuit may operate in either a "record" mode or a "read" mode, depending upon the position of a plurality of switches 10*a*, 10*b*, 10*c*. In the "record" mode, pulses from a dial 12 actuate a conventional Schmitt trigger generator 14 which, in turn, feeds controls signals to a combined transducer drive control and pulse reconstitution circuit 15. Signals out of the latter are impressed on a transducer 16 for recording on a magnetic storage medium 18. The dial 12 may be of any known design, as for example that shown by Kobler, U.S. Patent No. 3,107,287, incorporating, in addition to a conventional "pulsing" switch, a "motor start" switch 12*a* actuated on release of a dial wheel from a "stop" position. Thus, as pulses are generated by the dial 12, a transducer drive motor 20 is energized (by means described hereinafter) to cause the transducer 16 to move relative to the magnetic storage medium 18 to accomplish the desired recording.

When the switches 10*a*, 10*b*, 10*c* are in the "read" position, the transducer drive motor 20 is energized in response to operation of a "start" switch 22 and the transducer 16 is moved relative to the magnetic storage medium 18 to produce a signal output. This signal, after passing through an amplifier 24, actuates the Schmitt trigger generator 14, which, in turn, feeds the combined motor control and pulse reconstitution circuit 15, finally to produce signals on terminals 26, 28, which, in normal use, serve to connect the dialer here contemplated to a telephone line (not shown).

The combined motor control and pulse reconstitution circuit 15 comprises: (a) electronic means to energize the transducer drive motor 20 as follows for a period of approximately 2 seconds in the absence of signals out of the Schmitt trigger generator 14 or, alternatively, for a period beginning with the first pulse in a train of pulses out of the Schmitt trigger generator 14 and ending approximately 600 milliseconds after the last pulse in any such train; (b) electronic means for producing pulses at a rate of approximately 10 pulses per second even though the rate of the pulses out of the Schmitt trigger generator 14 may vary by as much as, say, ±8% from 10 pulses per second; and (c) means for interconnecting the foregoing two electronic means to attain the results set forth.

The electronic means to energize the transducer drive motor 20 comprises a motor conrtol flip-flop 30, an auxiliary motor control flip-flop 32 and an electronic switch 33 connected so as to program the periods during which a motor control solenoid 34 is energized, thereby to open and close a motor on-off switch 34*a*. When the motor control flip-flop 30 is set, current flows through the motor control solenoid 34, thereby closing motor on-off switch 34*a* to energize the transducer drive motor 20. Conversely when the motor control flip-flop is reset, current does not flow through the motor control solenoid 34, thereby opening the motor on-off switch 34*a* to de-energize the transducer drive motor 20. The motor control flip-flop 30 and the auxiliary motor control flip-flop 32 may be of any form provided only that the former is so arranged as to be in its reset condition when the transducer drive motor 20 is de-energized while the latter is then in its set condition. It may be seen therefore, that actuation of either switch 12*a* or switch 22 (depending on the condition of switch 10*b*) will set motor control flip-flop 30 (finally, as noted above to energize the transducer drive motor 20) and permit current to pass through a resistor 36 to charge a capacitor 38. Since, however, the auxiliary motor control flip-flop 32 is in its set condition, current may not, through a resistor 40, a diode 42 and an inverter 44, flow therefrom to charge the capacitor 38. The latter element, being connected through a diode 46 to a unijunction transistor 48 (as a type 2N2646) causes that element to discharge when its "firing" voltage is reached, thereby causing the voltage at the top of resistor 50 suddenly to go positive. The top of the resistor 50 is connected to an AND gate 52 and to an AND gate 54. The former is enabled, via a delay circuit 56, only when the auxiliary motor control flip-flop 32 is reset while the latter is enabled, via a delay circuit 58 only when the auxiliary motor control flip-flop 32 is set. It will be noted here that the AND gates 52, 54 are also controlled by the pulse reconstituting means, but such control is not here essential to an understanding of operation of the motor control circuit in the absence of pulses. It will be here assumed, for purposes of explanation, that the second enabling signal to the AND gates 42, 54 is present. It follows then, that since the auxiliary motor control flip-flop 32 is set, AND gate 52 is disabled and AND gate 54 is enabled when the unijunction transistor 48 fires for the first time. This means that the resulting signal at the top of the resistor 50 passes only through AND gate 54 to an OR gate 60 to the reset terminal of the auxiliary motor control flip-flop 32. Such a pulse changes the state of that flip-flop, thereby enabling AND gate 52, disabling AND gate 54, through delay circuits 56, 58, respectively, and forcing current to flow through diode 42 and resistor 40 to increase the charging current to capacitor 38. As a result of such increased charging current, the firing voltage of the unijunction transistor 48 is reached in a shorter period of time than the period required when current passed only through resistor 36. Typically, if a two second "motor on" period is desired, the first firing of the unijunction transistor 48 would occur (by selecting appropriate values for resistor 36 and capacitor 38 for use with a given unijunction transistor with a given voltage impressed across it) 1.4 seconds after the start switch 12*a* or 22 is actuated and the second firing would occur .6 second after the first (by using an appropriate value of resistance for resistor 40). The second firing of the unijunction transistor, therefore, occurs when the AND gate 52 is enabled, thus allowing a control signal to the reset terminal of the motor control flip-flop 30. The change of state of that flip-flop de-energizes the motor control solenoid 34 (finally to de-energize the transducer drive motor 20) and through an inverter 62 and an OR gate 64, sets the auxiliary motor control flip-flop 32. Thus, the just described circuit is automatically returned to its quiescent states, if no pulses are emitted from the Schmitt trigger generator 14, for the two second period following "start" of the motor control flip-flop 30.

If pulses are emitted from the Schmitt trigger generator 14 within a two second period after the "start" of the motor control flip-flop 30, the auxiliary motor control flip-flop 32 is, if in its reset condition, forced back into the set condition by the pulse from the Schmitt trigger generator 14. Thus, the motor control flip-flop 30 and the auxiliary motor control flip-flop 32 are then in the same condition as they were when either of the "start" switches 12*a*, 22 were actuated, whether the switches 10*a*, 10*b*, 10*c* are in the "record" or "read" position.

The pulses out of the Schmitt trigger generator 14 also initiate operaiton of a pair of pulse forming flip-flops, here called respectively, the 40 ms. flip-flop 66 and the 60 ms. flip-flop 68. Each of these two flip-flops is designed to be normally in its reset condition. Thus, when a pulse from the Schmitt trigger generator 14 is impressed on an AND gate 70 it may pass through that gate, then through an OR gate 72 to set the 40 ms. flip-flop 66. The normal output of the latter then may actuate an electronic switch 73 as follows. Current from the 40 ms. flip-flop 66 flows through a diode 74 and a resistor 76 to charge a capacitor 78. At the same time, an OR gate 80 passes an enabling signal from the 40 ms. flip-flop 66 to an AND gate 82. Thus, since the auxiliary motor control flip-flop 32 is set, current from the normal output of the latter flip-flop flows through the AND gate 82, a diode 84 and a resistor 86 to augment the charging current to the capacitor 78. The latter element, in turn, is connected across a unijunction transistor 88 (say, a type 2N2646) and a resistor 90, as shown. Thus, when the voltage across the unijunction transistor 88 reaches the firing voltage thereof a pulse signal is generated at the top of the resistor 90 and applied to AND gates 92, 94 which are, respectively, connected to the reset terminals of the 40 ms. and 60 ms. flip-flops 66, 68. The normal output terminal or flip-flop 66 is connected, through a delay circuit 96, to the AND gate 92 while the normal output of the flip-flop 94 is connected, through a delay circuit 98, to the AND gate 94. Thus, at the time the unijunction transistor 88 fires, AND gate 92 is enabled (causing the 40 ms. flip-flop 66 to reset) but AND gate 94 is disabled.

The complementary output (as indicated by an inverter 100) of the 40 ms. flip-flop 66 is fed to an AND gate 102 and an AND gate 104. The latter gate is enabled whenever both the motor control flip-flop 30 and the auxiliary motor control flip-flop 32 are set. Reset of the 40 ms. flip-flop 66, then causes set of the 60 ms. flip-flop 68. As a result of this operation, current flows through diode 104, and resistor 108 to charge capacitor 78 until the unijunction transistor 88 again fires. On the second firing of the latter element, the 60 ms. flip-flop 68 resets. The 40 ms. flip-flop is then set by a signal from the complementary output (as represented by the inverter 110) passing through the OR gate 72. The 40 ms. flip-flop 66 then goes through its cycle of operation as described hereinbefore. If, however, a second pulse is not received from the Schmitt trigger generator 14 about the time the 40 ms. flip-flop is set for the second time, the auxiliary motor control flip-flop 32 remains disabled so that the second reset of the 40 ms. flip-flop 66 does not then set the 60 ms. flip-flop 68. If, on the other hand, a pulse is received from the Schmitt trigger generator 32 about the time the 40 ms. flip-flop 66 is set for the second time, then the AND gate 104 is enabled when the 40 ms. flip-flop 66 resets for the second time, so the alternate operation of the 40 ms. flip-flop 66 and the 60 ms. flip-flop 68 continues until the end of a train of pulses from the Schmitt trigger generator 14.

Setting and resetting of the 60 ms. flip-flop 68 provides a control signal to the AND gates 52, 54 via the delay circuits 112, 114, and, through a coupling circuit 116, to a capacitor 118 in the electronic switch 33. Thus, each time the 60 ms. flip-flop 68 is reset (indicating the end of a pulse to be recorded or transmitted in accordance with the position of the switch 10*c*) the electronic switch 33 starts its operation as described hereinbefore. To complete the described circuit, a pulsing solenoid 120 is connected (when the switch 10*c* is in its "read" position) to control a normally closed contactor 122. Thus, as the 60 ms. flip-flop 68 is set and reset in accordance with pulses read out of the magnetic recording medium 18, the pulsing contactor 122 is opened and closed in synchronism with the setting and resetting of the 60 ms. flip-flop 68.

The foregoing explanation of the operation of the 40 ms. flip-flop 66 and the 60 ms. flip-flop 68 presupposed that the interval between pulses out of the Schmitt trigger generator 14 is exactly 100 milliseconds. If, for any reason, any error tends to cause such interval to be greater or less than 100 milliseconds, then, compensation for such difference is effected. Thus, current flows through resistor 86 whenever the auxiliary motor control flip-flop 32 is set and either the 40 ms. flip-flop 66 or the 60 ms. flip-flop 68 is set. For pulses after the first pulse in a train out of the Schmitt trigger generator 14, setting of the 40 ms. flip-flop 66 is controlled by resetting of the 60 ms. flip-flop 68, but control of the setting of the auxiliary motor control flip-flop remains with the Schmitt trigger generator 14. It follows, then, that if the pulses out of the Schmitt trigger generator 14 are spaced at interval less than 100 milliseconds, current will flow through the resistor 86 and, consequently, the unijunction transistor 88 will fire sooner. On the other hand, if the pulses out of the Schmitt trigger generator 14 are spaced at intervals greater than 100 milliseconds, the auxiliary motor control flip-flop 32 will not be set until after the 40 ms. flip-flop 66 has been set. Therefore, during the earlier part of the set period of the 40 ms. flip-flop 66, less current will pass through resistor 86 than would pass therethrough if the auxiliary motor control flip-flop 32 were set simultaneously with the 40 ms. flip-flop 66. This means that the charging time of the capacitor 78 (when the 40 ms. flip-flop 66 is set) to fire the unijunction transistor 88 is lengthened. The exact amount of the lengthening or the shortening of the nominal set and reset times of the 40 ms. flip-flop 66 and the 60 ms. flip-flop 68 is dependent on the value of the resistor 86 relative to the resistors 76, 108. As the resistance of the resistor 86 approaches the resistance of resistor 108, then the period of the signal at the complementary output of the 60 ms. flip-flop 68 follows the period of the input pulses (from the Schmitt trigger generator 14) over wide variations therein, but the ratio of the set periods of the 40 ms. flip-flop 66 and the 60 ms. flip-flop 68 varies. On the other hand, if the resistor 86 is relatively very large compared to resistor 108, then the signal at the complementary output of the 60 ms. flip-flop 68 will not closely follow the input pulses (from the Schmitt trigger generator 14) but the ratio of the set periods of the 40 ms. flip-flop 66 and the 60 ms. flip-flop 68 will remain almost invariant. It will be obvious to one of skill in the art, then, that the relative value of the resistor 86 should be a compromise value the best to maintain the spacing between pulses at the complementary output of the 60 ms. flip-flop 68 and the desired ratio of pulses to spaces there.

It will also be obvious to one skilled in the art that the invention is not limited to generation of pulses of the particular kind here set forth. That is, the 40 ms. flip-flop 66 and the 60 ms. flip-flop 68 may be changed as desired to attain any desired pulse/space ratio within very wide limits. It is felt, therefore, that the invention should not be restricted to its disclosed embodiment, but rather should be limited only by the spirit and scope of the appended claims.

What is claimed is:

1. A circuit for producing, in response to a train of pulse signals wherein the interval between successive ones of the pulse signals may vary, a similar train of digital signals wherein the interval between successive ones of the digital signals is substantially fixed, comprising:

(a) digital signal forming means, including a first and a second flip-flop and an electronic gate, for producing a train of digital signals wherein the interval between successive ones of the digital signals is substantially fixed;

(b) means, including a control flip-flop set by each pulse in the train of pulse signals and reset by the complementary output of the first flip-flop, for enabling the digital signal forming means for a period of time, less than the interval between successive ones of the digital signals; and, (c) means, for connecting the digital signal produced by the digital signal forming means to a utilization device.

2. A circuit as in claim 1 having, in addition, means responsive to the normal output of the control flip-flop, for modifying, in accordance with the difference between the time of occurrence of each pulse in the train of pulse signals and the time of occurrence of each corresponding digital signal in the train of digital signals, the periods of the first and the second flip-flops.

3. A repertory dialer utilizing a magnetic recorder for storing a train of dial pulses representative of a selected telephone number, comprising:

(a) means for moving a magnetic transducer relative to a magnetic record medium as the dial pulses representative of each digit in a selected telephone number are generated and for a fixed period thereafter;

(b) means, responsive successively to each of the dial pulses in each digit, for generating a digital signal having a nominal width:

(c) means, responsive to the difference of the interval between successive pairs of dial pulses from a nominal interval, for varying the width of the second digital signal in each successive pair thereof to adjust the interval between the digital signals toward the nominal interval; and, (d) means for applying the digital signals to the magnetic transducer to store such signals in the record medium.

4. A repertory dialer utilizing a magnetic recorder wherein a train of digital signals representative of a selected telephone number is recorded in a magnetic record medium comprising:

(a) means for moving a magnetic transducer adjacent to the magnetic record medium to produce a train of pulses corresponding to the train of digital signals stored in the magnetic record medium;

(b) means for generating, in response to each pulse in the train thereof, a train of dial pulses wherein the width of each such pulse has a nominal width;

(c) means, responsive to the difference with respect to a nominal interval, of the interval between successive pairs of pulses in the train thereof, for varying the width of the second dial pulse in each successive pair thereof to adjust the interval between the dial pulses toward the normal interval; and, (d) means for connecting the train of dial pulses to a telephone line.

5. A repertory dialer utilizing a magnetic recorder for the storing and the reproduction of a train of pulse signals representative of a selected telephone number, comprising:

(a) means, responsive to a manually actuated switch, for initiating a fixed amount of relative motion between a record medium in the magnetic recorder;

(b) means successively responsive to each pulse signal in the train of pulse signals representative of a selected telephone number, for restarting the first named means;

(c) means, responsive to the train of pulse signals, for generating an output train of signals wherein the width of each signal in such output train has a first nominal value; and, (d) means, responsive to the spacing between the pulse signals in the train thereof, for varying the width of each signal in the output train to cause the spacing between each such signal to approach a second nominal value.

References Cited

UNITED STATES PATENTS 3,341,666 9/1967 J. L. Wallace -------- 179—90

WILLIAM C. COOPER, *Primary Examiner.*

A. H. GESS, *Assistant Examiner.*